US009042137B2

(12) United States Patent
Heo et al.

(10) Patent No.: US 9,042,137 B2
(45) Date of Patent: May 26, 2015

(54) EVEN-LEVEL INVERTER

(75) Inventors: Min Ho Heo, Gyunggi-do (KR); Tae Hoon Kim, Gyunggi-do (KR); Sung Jun Park, Gwangju (KR); Doo Young Song, Gyunggi-do (KR); Tae Won Lee, Gyunggi-do (KR)

(73) Assignees: SAMSUNG ELECTRO-MECHANICS CO., LTD., Suwon, Gyunggi-Do (KR); INDUSTRY FOUNDATION OF CHONNAM NATIONAL UNIVERSITY, Buk-Gu, Gwangju (KR)

( * ) Notice: Subject to any disclaimer, the term of this patent is extended or adjusted under 35 U.S.C. 154(b) by 194 days.

(21) Appl. No.: 13/364,001

(22) Filed: Feb. 1, 2012

(65) Prior Publication Data
US 2013/0094267 A1    Apr. 18, 2013

(30) Foreign Application Priority Data
Jan. 14, 2011 (KR) ................. 10-2011-0105234

(51) Int. Cl.
H02H 7/122 (2006.01)
H02M 5/42 (2006.01)
H02M 7/68 (2006.01)
H02M 7/5387 (2007.01)
H02M 7/483 (2007.01)
H02M 1/00 (2006.01)

(52) U.S. Cl.
CPC ...... *H02M 7/483* (2013.01); *H02M 2001/0074* (2013.01)

(58) Field of Classification Search
USPC ........................ 363/56.02, 98, 132
See application file for complete search history.

(56) References Cited

U.S. PATENT DOCUMENTS

| 6,031,738 A * | 2/2000 | Lipo et al. ................ 363/98 |
| 2011/0080147 A1* | 4/2011 | Schoenlinner et al. ....... 323/282 |
| 2011/0103099 A1 | 5/2011 | Moki |
| 2012/0243273 A1 | 9/2012 | Rasoanarivo |

FOREIGN PATENT DOCUMENTS

| DE | 10 2006 010 694 A1 | 9/2007 |
| JP | 57-177284 A | 10/1982 |
| JP | 2007-028860 A | 2/2007 |

(Continued)

OTHER PUBLICATIONS

Korean Office Action, and English translation thereof, issued in Korean Patent Application No. 10-2011-0105234 mailed Sep. 28, 2012.

(Continued)

*Primary Examiner* — Jue Zhang
(74) *Attorney, Agent, or Firm* — McDermott Will & Emery LLP

(57) ABSTRACT

There is provided an even-level inverter, including: a voltage-dividing circuit dividing input DC power into an even number of voltage levels; a plurality of switching devices connected to individual nodes of the voltage-dividing circuit having the even number of voltage levels; and a bidirectional switching device connected to the individual nodes of the voltage-dividing circuit through at least one of the plurality of switching devices and including at least two transistors. According to the present invention, the bidirectional switching device is implemented without a diode to thereby reduce conduction loss caused due to an anti-parallel diode included in the related art bidirectional switching device, and a neutral point of the voltage-dividing circuit is electrically separated from the switching devices to thereby control reactive power.

19 Claims, 7 Drawing Sheets

(56) References Cited

FOREIGN PATENT DOCUMENTS

| KR | 2002-0005883 | 1/2002 |
|---|---|---|
| KR | 10-2011-0011370 | 2/2011 |
| WO | 2011/058273 A2 | 5/2011 |

OTHER PUBLICATIONS

Lee, Ho et al. "Full-bridge A Single Phase Inverter using the Central Arm." Chonnam National University. pp. 39-40. Jul. 2010. English abstract attached.

Ralph Teichmann, Steffen Bernet, IEEE Journal 1, Investigation and Comparison of Auxiliary Resonant Commutated Pole Converter Topologies, 1988.
Damien Coutellier, Vassilios G. Agelidis, Sewan Choi, IEEE Journal 2, Experimental Verification of Floating-Output Interleaved-Input DC-DC High-Gain Transformer-less Converter Topologies, 2008.
Korean Office Action and English translation issued in Korean Patent Application No. 10-2011-0105234 mailed Jan. 31, 2013.
Extended European Search Report issued in European Application No. 12275007.8 dated Feb. 21, 2013.
Chinese Office Action issued in Chinese Patent Application No. 20120022371.0 dated Jun. 27, 2014, w/English translation.

* cited by examiner

EVEN-LEVEL INVERTER

CROSS-REFERENCE TO RELATED APPLICATIONS

This application claims the priority of Korean Patent Application No. 10-2011-0105234 filed on Oct. 14, 2011, in the Korean Intellectual Property Office, the disclosure of which is incorporated herein by reference.

BACKGROUND OF THE INVENTION

1. Field of the Invention

The present invention relates to an even-level inverter that voltage-divides input DC power into an even number of voltage levels and generates AC output signals having the even number of voltage levels by using a plurality of switching devices, while reducing conduction loss and controlling reactive power by removing an anti-parallel diode from a bidirectional switching device and separating a center tap of a voltage-dividing circuit from the switching device.

2. Description of the Related Art

An inverter, a circuit outputting an AC signal after receiving DC power, may control the magnitude, frequency, and harmonic component of the output AC signal. In general, an inverter may be classified into a 2-level inverter, a 3-level inverter, and the like, according to a level (magnitude) of the output AC signal, and may include a circuit that voltage-divides the input DC power into the number of required levels and a switching circuit that generates the AC output signal from the input DC power which is voltage-divided into the number of required levels.

In a 3-level inverter, widely used in general, a circuit that voltage-divides the input DC power into three levels may be implemented by capacitors having the same capacity and a switching circuit may include a plurality of switching devices in which a transistor and a diode are connected to each other. In particular, in the inverter circuit according to the related art, a bidirectional switching device is connected to a center tap of a voltage-dividing circuit to provide a path required for an output signal according to each operating mode.

However, as described in the related art, since the related art inverter circuit has a structure in which the switching device is directly connected to a center tap of a voltage-dividing circuit, it is very difficult to control reactive power. Furthermore, since a transistor and an anti-parallel diode are included in all switching devices, conduction loss may be deteriorated.

RELATED ART

Patent Document (Patent Document 1) U.S. Patent Application Publication No. US 2011/0103099

SUMMARY OF THE INVENTION

An aspect of the present invention provides an inverter capable of reducing conduction loss and controlling reactive power by separating a center tap (neutral point) of a circuit that voltage-divides input DC power from a switching device and implementing a bidirectional switching device using only a transistor, without an anti-parallel diode.

According to an aspect of the present invention, there is provided an even-level inverter, including: a voltage-dividing circuit dividing input DC power into an even number of voltage levels; a plurality of switching devices connected to individual nodes of the voltage-dividing circuit having the even number of voltage levels; and a bidirectional switching device connected to the individual nodes of the voltage-dividing circuit through at least one of the plurality of switching devices and including at least two transistors.

The voltage-dividing circuit may include at least two capacitors, and a node between the at least two capacitors may be electrically separated from the plurality of switching devices and the bidirectional switching device.

The voltage-dividing circuit may further include a plurality of booster circuits respectively connected to the at least two capacitors, and the plurality of booster circuits may share at least one node.

The node shared by the plurality of booster circuits may be connected to the node between the at least two capacitors.

The plurality of switching devices may include at least one transistor and at least one diode, and the plurality of switching devices may have a structure different from that of the bidirectional switching device.

The bidirectional switching device may only include a transistor.

The plurality of switching devices and the bidirectional switching device may provide different current paths in accordance with four voltage levels output from the voltage-dividing circuit.

The voltage-dividing circuit may divide the input DC power into four voltage levels.

According to another aspect of the present invention, there is provided an even-level inverter, including: a voltage-dividing circuit generating input DC power having an even number of voltage levels; and a switching circuit receiving the input DC power and generating an AC output signal, wherein the voltage-dividing circuit includes a plurality of capacitors connected in series, and a node between the plurality of capacitors connected in series is electrically separated from the switching circuit.

The switching circuit may include a plurality of first switching devices including a transistor and a diode and at least one second switching device including a plurality of transistors only.

The first switching devices and the second switching device may provide different current paths in accordance with the voltage levels of the input DC power.

The voltage-dividing circuit may divide the input DC power into four voltage levels.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
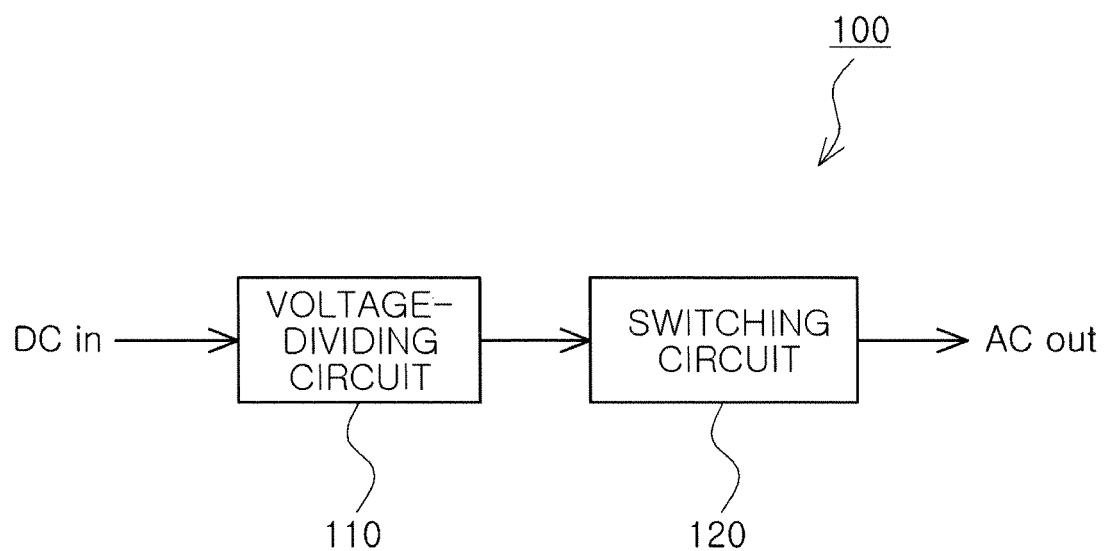
FIG. 1 is a schematic block diagram of an even-level inverter according to an embodiment of the present invention.

Embodiments of the present invention will be described in detail with reference to the accompanying drawings. These embodiments will be described in detail in order to allow those skilled in the art to practice the present invention. It should be appreciated that various embodiments of the present invention are different, but are not necessarily exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment may be changed without departing from the spirit and the scope of the present invention. Therefore, the detailed description provided below should not be construed as being restrictive. In addition, the scope of the present invention is defined only by the accompanying claims and their equivalents if appropriate. Similar reference numerals will be used to describe elements having the same or similar functions throughout the accompanying drawings.

Hereinafter, embodiments of the present invention will be described in detail with reference to the accompanying drawings so that those skilled in the art may easily practice the present invention.

FIG. 1 is a schematic block diagram of an even-level inverter according to an embodiment of the present invention. Referring to FIG. 1, an even-level inverter 100 according to the embodiment of the invention includes a voltage-dividing circuit 110 and a switching circuit 120.

The voltage-dividing circuit 110 receives an input DC power DCin and generates signals having a predetermined number of levels. Since it is assumed that a 4-level inverter is adopted in the present embodiment, the voltage-dividing circuit 110 may generate signals having a total of four different levels. The voltage-dividing circuit 110 may include a plurality of capacitors and a booster circuit in order to generate the signals having different levels. The signals having different levels, generated by the voltage-dividing circuit 110, are transferred to the switching circuit 120 to be used to generate AC output signals ACout.

The switching circuit 120 includes a plurality of switching devices and generates the AC output signals ACout ACout from the signals having different levels generated by the voltage-dividing circuit 110. The plurality of switching devices included in the switching circuit 120 may be divided into a first switching device and a second switching device having different structures, at least one of which may be configured of only a transistor without a diode. Hereinafter, for convenience of explanation, it will be assumed that the second switching device is a bidirectional switching device configured of only a transistor without a diode, and the first switching device is configured of a transistor and a diode.

The plurality of switching devices, included in the switching circuit 120 in order to generate the AC output signals ACout, generate different current paths according to the levels of the signals transferred from the voltage-dividing circuit 110. For example, when it is assumed that signals having four different voltage levels are applied to the switching circuit 120, the switching circuit 120 may include four first switching devices and a single second switching device. As described above, the four first switching devices may be configured by connecting a transistor (preferably, an NMOS field-effect transistor) and a diode in parallel, and the second switching device may be configured by connecting two transistors in parallel.

The second switching device operating as the bidirectional switching device may be connected to all the four first switching devices, and the four first switching devices may be connected to an output tap of the voltage-dividing circuit 110 outputting the signals having four different voltage levels and may form respective current paths according to the voltage levels of the signals input thereto. Meanwhile, both the first and second switching devices are positioned to be electrically separated from a neutral point of the voltage-dividing circuit 110 such that reactive power may be efficiently controlled.

Figure 2:
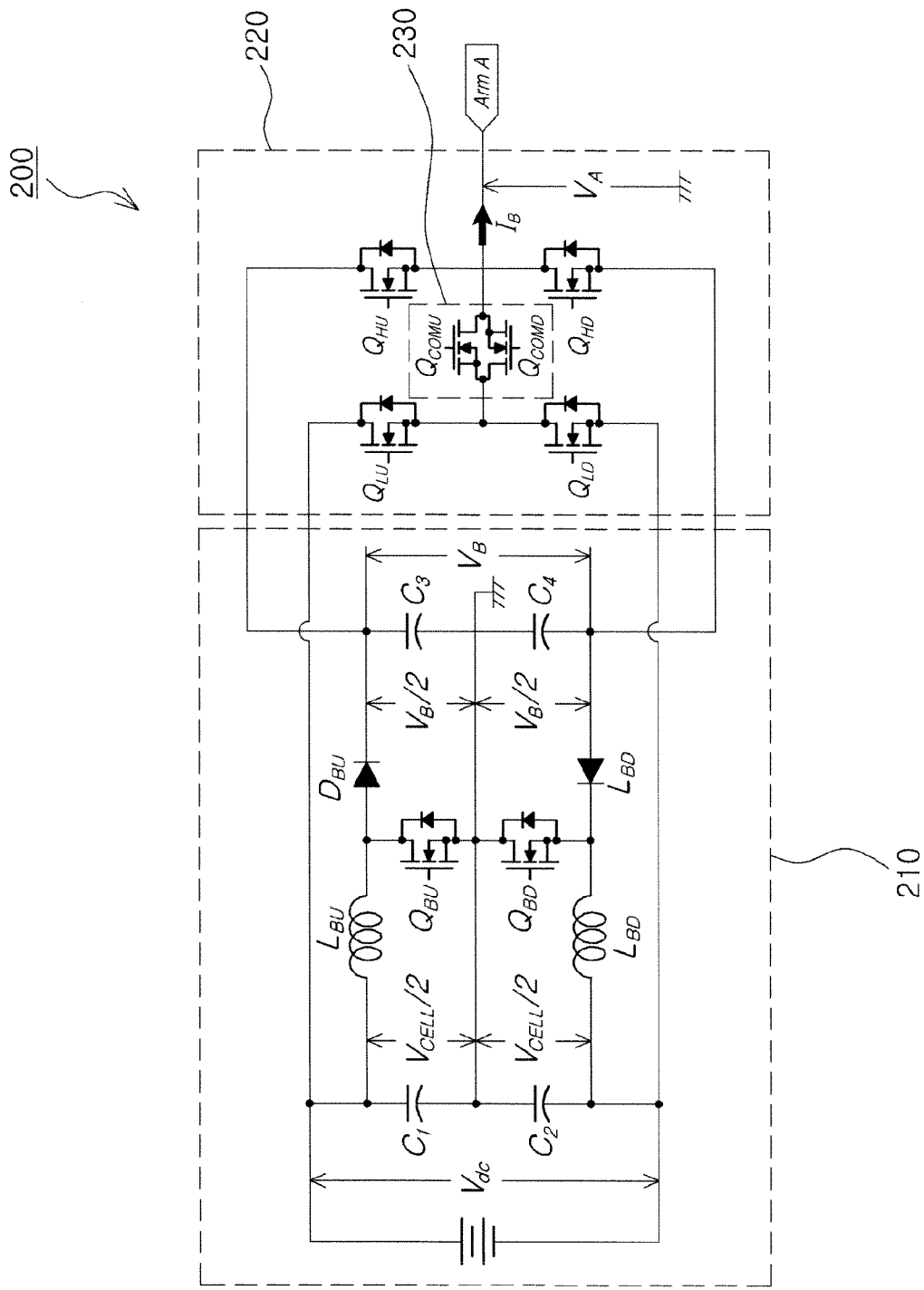
FIG. 2 is a circuit diagram of an even-level inverter according to an embodiment of the present invention.

FIG. 2 is a circuit diagram of an even-level inverter according to an embodiment of the present invention.

Referring to FIG. 2, an even-level inverter 200 according to the present embodiment includes a voltage-dividing circuit 210, a switching circuit 220 connected to the voltage-dividing circuit 210 to transfer an output AC signal $I_A$ to an output terminal ARMs, and a bidirectional switching device 230 included in the switching circuit 220 to form a current path of the output AC signal $I_A$.

The voltage-dividing circuit 210 includes booster circuits including a DC power cell generating input DC power, a plurality of capacitors C1 to C4, inductors $L_{BU}$ and $L_{BD}$, switching devices $Q_{BU}$ and $Q_{BD}$, and diodes $D_{BU}$ and $D_{BD}$. As shown in FIG. 2, an output voltage Vcell of the DC power cell is divided into voltages corresponding to Vcell/2 by the capacitors C1 and C2 connected in series to be transferred to the switching devices $Q_{LU}$ and $Q_{LD}$. Meanwhile, the voltages corresponding to Vcell/2 passing through the inductors $L_{BU}$ and $L_{BD}$ and the diodes $D_{BU}$ and $D_{BD}$ are divided into DC voltages having a level of $V_B/2$ by the capacitors C3 and C4 and transferred to switching devices $Q_{HU}$ and $Q_{HD}$.

That is, the voltage-dividing circuit 210 resultantly generates the DC voltages having a total of four levels such as ±Vcell/2 and ±$V_B$/2, and these voltages are transferred to the switching devices $Q_{HU}$, $Q_{HD}$, $Q_{LU}$ and $Q_{LD}$, respectively. Each of the switching devices $Q_{HU}$, $Q_{HD}$, $Q_{LU}$ and $Q_{LD}$ has a structure in which a transistor (NMOS field-effect transistor) and a diode are connected in parallel. A current path through the diode or the transistor is formed according to the transferred voltages, and as a result, the output AC signals $I_A$ are transferred to the output terminal ARMs through different current paths according to the voltages having the four levels and operating modes. A relationship between absolute values of the voltages transferred to the switching devices $Q_{HU}$, $Q_{HD}$, $Q_{LU}$ and $Q_{LD}$ is shown in the following Equation 1:

$$|V_B| > |V_{cell}| \qquad \text{Equation 1}$$

Therefore, a current path with respect to DC voltage having the highest level is formed through the switching devices $Q_{HU}$ and $Q_{HD}$ and a current path with respect to DC voltage having an intermediate level is formed through the switching devices $Q_{LU}$ and $Q_{LD}$.

At least some of the plurality of current paths with respect to the voltages having the four levels may be formed as a path passing through the bidirectional switching device 230. In the present embodiment, an anti-parallel diode is removed from the bidirectional switching device 230 forming the current path and included in the switching circuit 220, and only two transistors are connected to each other in parallel, whereby conduction loss caused by the anti-parallel diode may be reduced.

Figure 3:
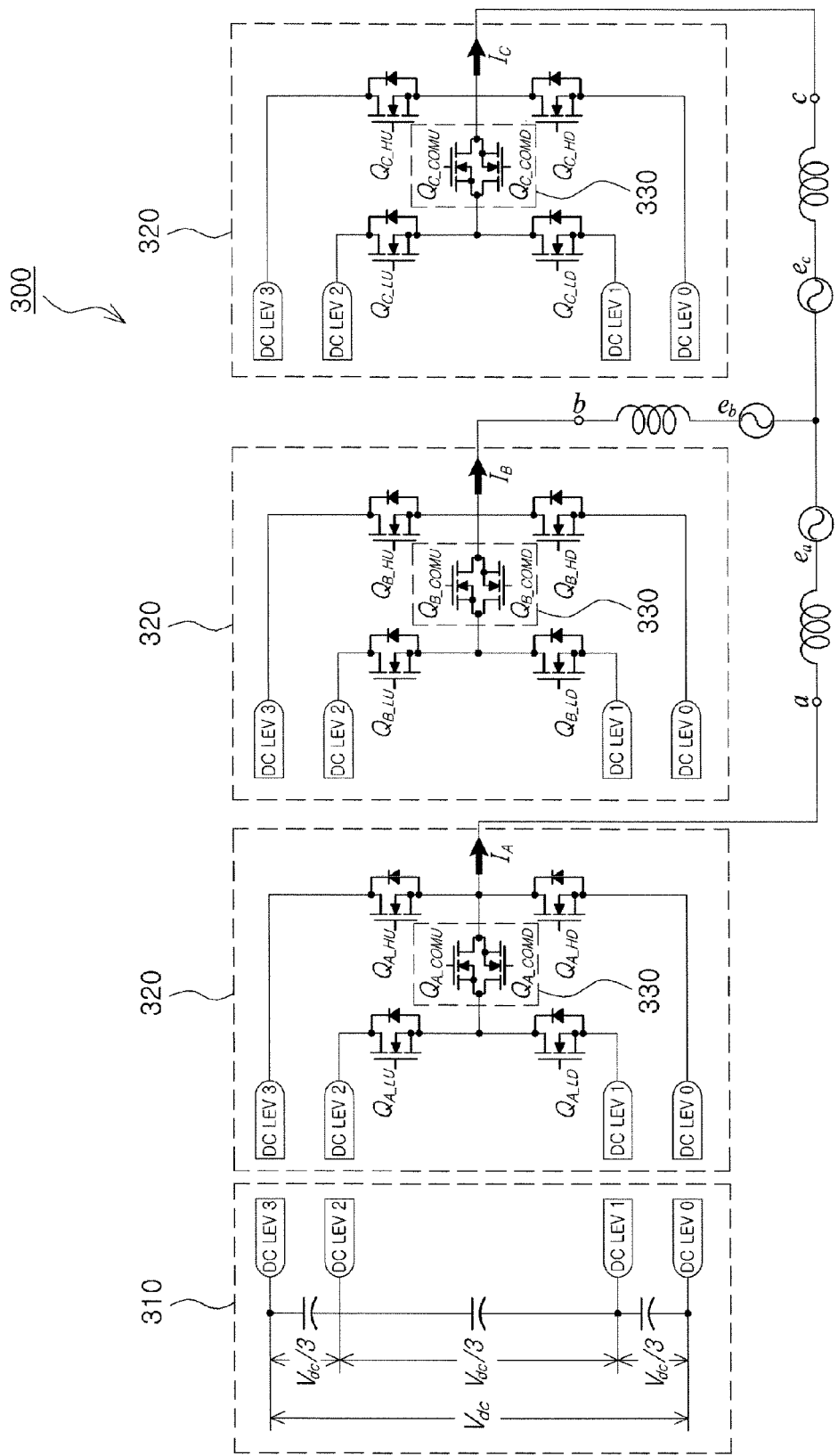
FIG. 3 is a circuit diagram illustrating a drive topology of an even-level inverter according to an embodiment of the present invention.

FIG. 3 is a circuit diagram of a drive topology of an even-level inverter according to an embodiment of the present invention.

Referring to FIG. 3, input DC power Vdc is divided into voltages corresponding to Vdc/3 by three capacitors, and the voltages are transferred to switching devices through voltage output nodes DC LEV1 to LEV4, respectively. In order to simply illustrate a drive topology circuit 300, a voltage-dividing circuit 310 is constituted of one input DC power Vdc and three capacitors C1 to C3, but it should be noted that a booster circuit may be included therein.

An intermediate voltage output node (neutral point) is essentially required to divide input DC power into an odd number of levels. In the case of a general inverter, the neutral point is connected to any one of the switching devices. However, in the present embodiment, the input DC power Vdc is divided into an even number of levels such that the intermediate voltage output node (neutral point) outputting an intermediate level voltage may be omitted. Further, as shown in FIG. 2, two booster circuits connected in parallel are provided, and as a result, even when the neutral point is generated, the neutral point is not connected to the switching device but connected to a ground terminal, whereby reactive power may be controlled.

Figure 4:
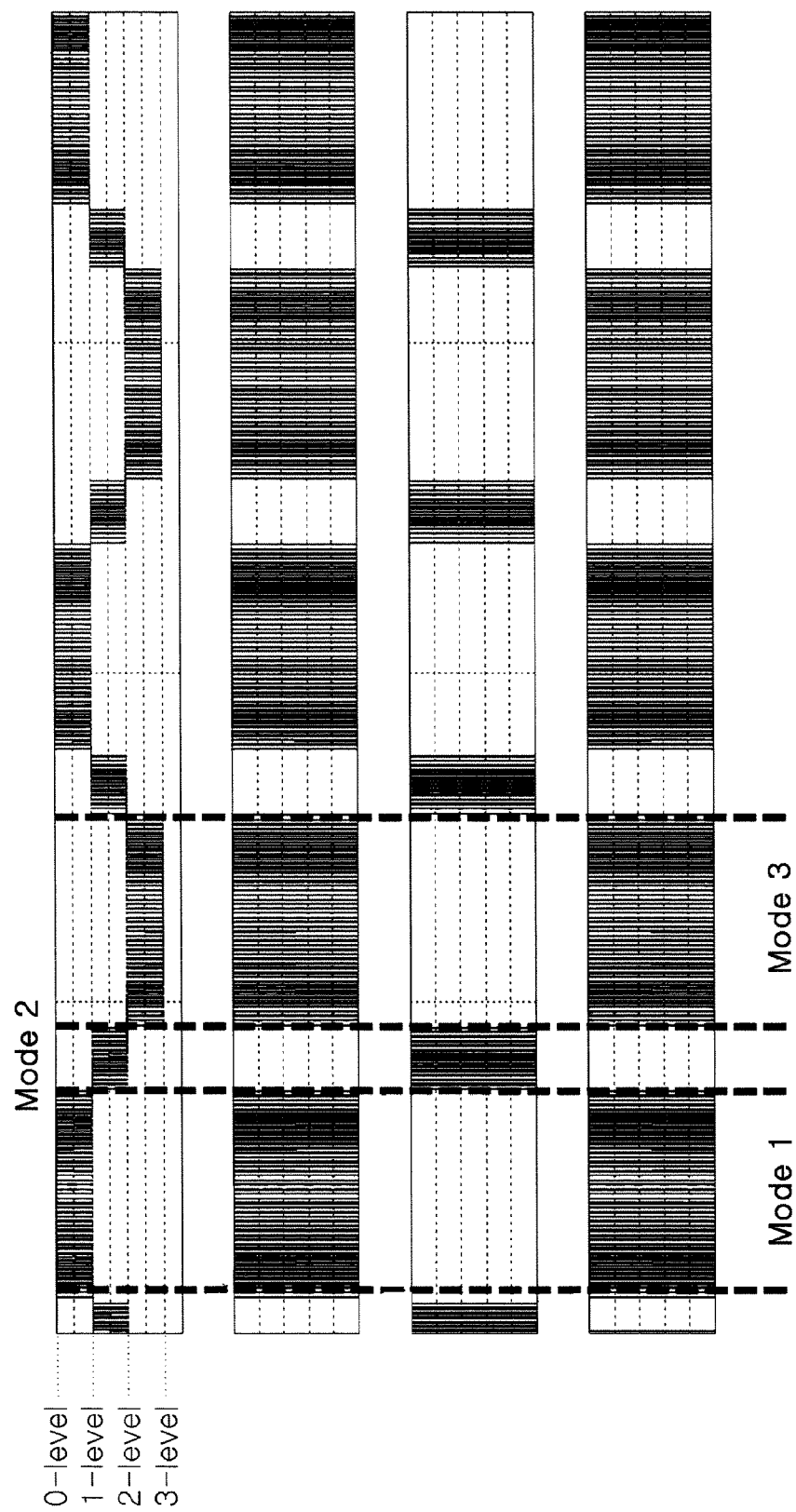
FIG. 4 is a graph illustrating a signal waveform depending on an operation of an even-level inverter according to an embodiment of the present invention.

FIG. 4 is a graph illustrating a signal waveform depending on the operation of an even-level inverter according to an embodiment of the present invention.

Referring to FIG. 4, it can be seen that voltages having different levels are output at modes 1 to 3, such that the voltages having the four different levels are output in an AC waveform pattern. Hereinafter, the operation of the switching device at each mode will be described. The operation will be described under the same condition as those of the voltage-dividing circuit 310, the plurality of switching devices 320, and the bidirectional switching device 330 described in the topology circuit 300 of FIG. 3. Further, FIGS. 5 through 7 will be referred for convenience of description.

Figure 5:
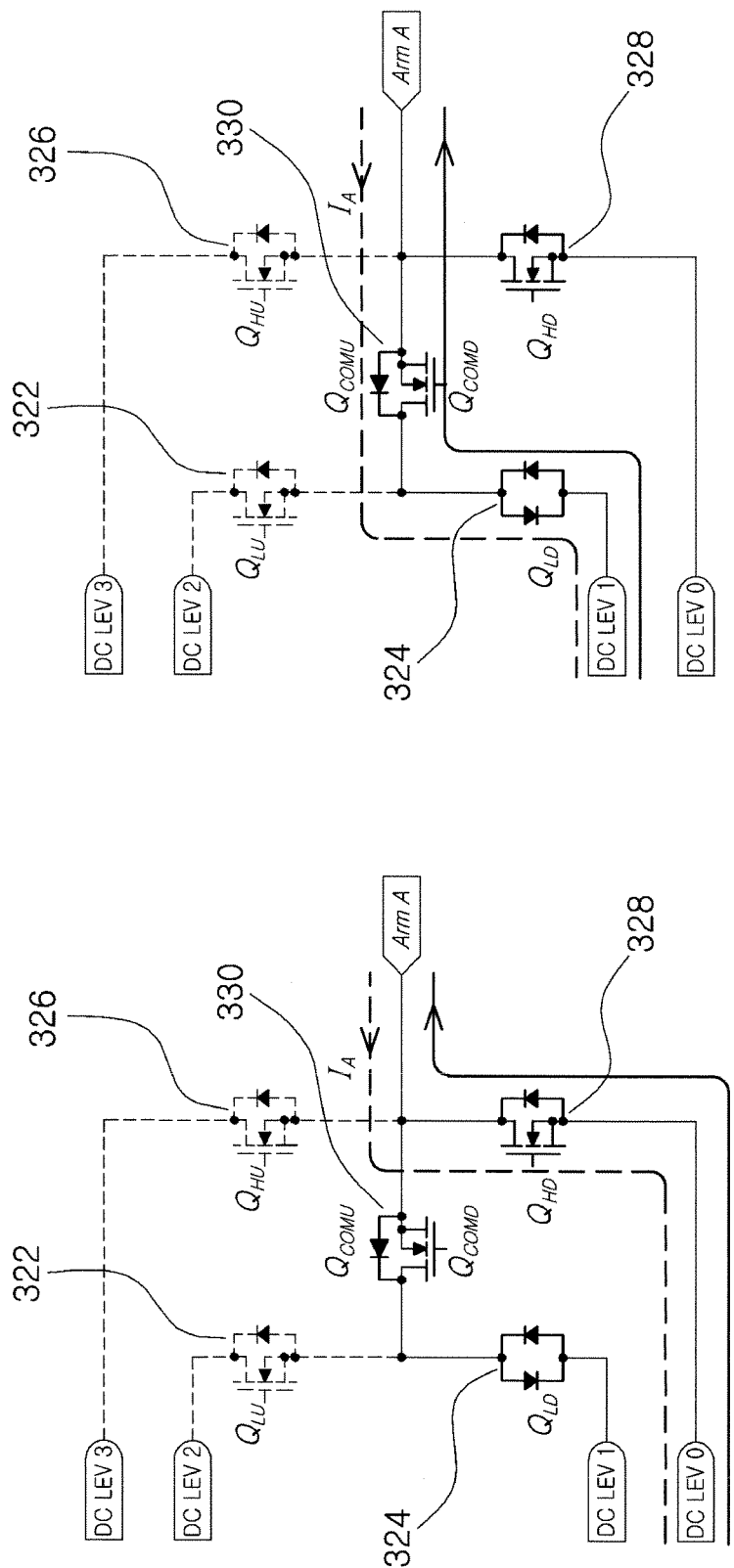
FIGS. 5 through 7 are circuit diagrams illustrating current paths at respective levels of an even-level inverter according to embodiments of the present invention.
Figure 6:
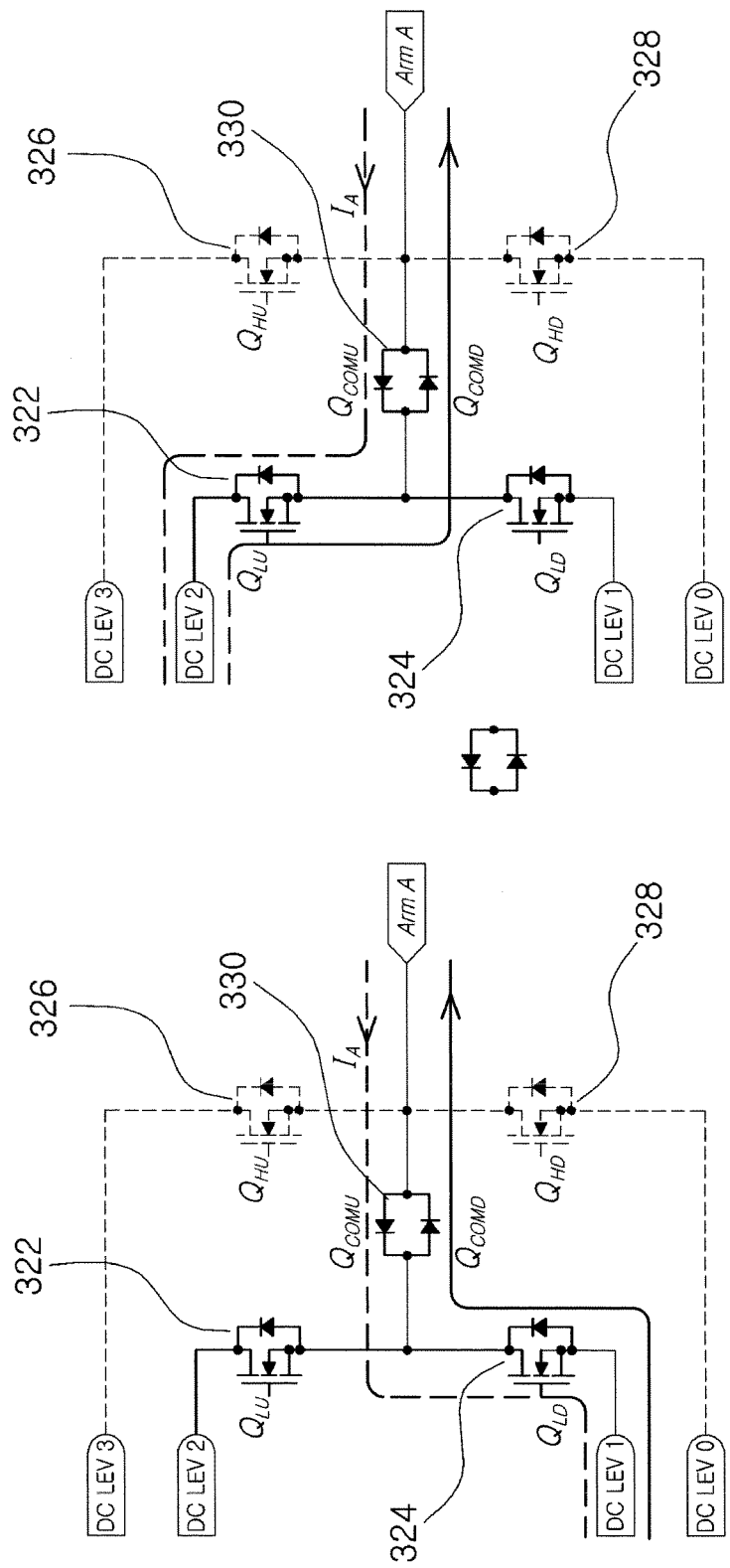
Figure 7:
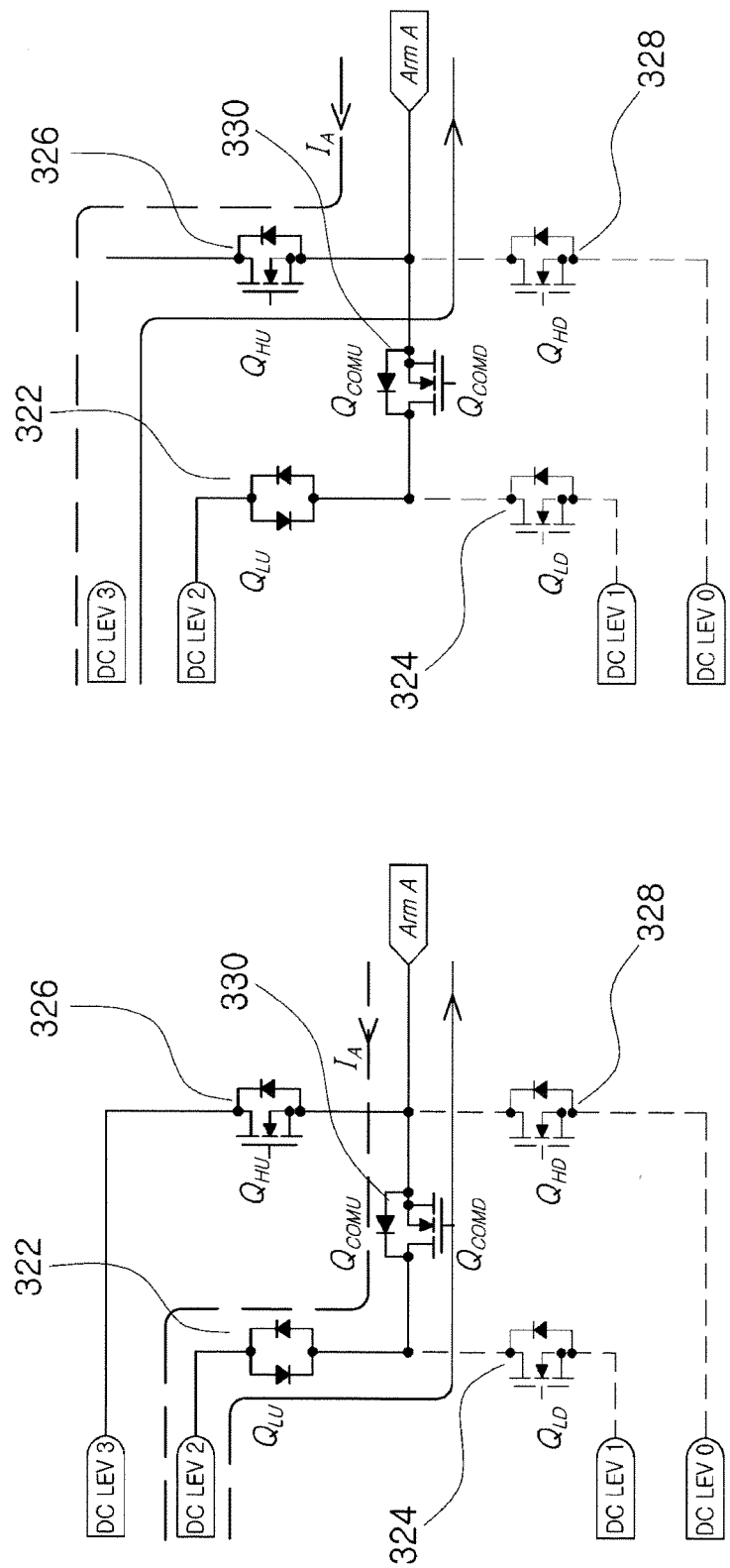

FIGS. 5 through 7 are diagrams illustrating current paths at respective levels of an even-level inverter according to embodiments of the present invention. Hereinafter, throughout FIGS. 5 through 7, a path represented by a solid line indicates the transfer of voltage output through an output terminal $ARM_A$, and a path represented by a broken line indicates a current path for generating the voltage output through the output terminal $ARM_A$. The level of the output voltage actually measured in the output terminal $ARM_A$ may be determined according to the number of the series-connected capacitors C1 to C3 included in the voltage-dividing circuit 310, through which the current path represented by the broken line passes, in the topology circuit 300 of FIG. 3.

First, the operation of the inverter circuit according to the present embodiment will be described below with reference to FIG. 5 in which the voltage level generated at mode 1 is described with reference to the current path. When a switching device 328 is turned on by the voltage $-V_B/2$ output from the voltage-dividing circuit 210 at mode 1, a 0-level voltage is output as shown in FIG. 5A. When the current path of FIG. 5 is applied to the topology circuit 300 of FIG. 3, the current $I_A$ flows along a current path passing through only the switching device 328 without passing through a bidirectional switching device 330, and as a result, the current has a voltage having a level of Vdc/3. Since the current cannot pass through any of the three series-connected capacitors C1 to C3, the 0-level voltage is output through the output terminal $ARM_A$.

Meanwhile, when a switching device 324 is turned on by the voltage −Vcell/2 output from the voltage-dividing circuit 210 at mode 1, a 1-level voltage is output as shown in FIG. 5B. That is, unlike the case in which the 0-level voltage is output at mode 1, a current path is formed to pass through the bidirectional switching device 330. The current $I_A$ passes through the bidirectional switching device 330, and as a result, the capacitor C3 between the node DC LEV1 and the node DC LEV0 of the voltage-dividing circuit 310 is included in the path of the current $I_A$. Accordingly, a voltage corresponding to the level of Vdc/3 is output through the output terminal $ARM_A$.

FIG. 6 is a circuit diagram for describing a current path generated at mode 2 and the resulting output voltage. Referring to FIG. 6A, when the switching device 324 is turned on by the voltage −Vcell/2 at mode 2, the same current path as the case in which the 1-level voltage is output as shown in FIG. 5B is formed. Therefore, like the case of FIG. 5B, since the current $I_A$ flows along the current path passing through the capacitor C3 connected between the node DC LEV1 and the node DC LEV0, a voltage corresponding to the level of Vdc/3 is output through the output terminal $ARM_A$.

Meanwhile, referring to FIG. 6B, when a switching device 322 is turned on by the voltage Vcell/2 at mode 2, a current path is formed to pass through the bidirectional switching device 330 and the turned-on switching device. When the current path of FIG. 6B is applied to the topology circuit 300 of FIG. 3, the current $I_A$ input along the current path represented by the broken line reaches the voltage-dividing circuit 310 and thereafter, sequentially passes through the nodes (DC LEV2→DC LEV1→DC LEV0) and the capacitors C2 and C3. Therefore, as shown in FIG. 6B, a voltage having a level of 2 Vdc/3 is output to the output terminal $ARM_A$.

Referring to FIG. 7A, when the switching device 322 is turned on by the voltage Vcell/2 at mode 3, a current path similar to that of FIG. 6B is formed. That is, the current $I_A$ reaches the voltage-dividing circuit 310 through the bidirectional switching device 330 and the turned-on switching device 322 and sequentially passes through the nodes (DC LEV2→DC LEV1→DC LEV0) and the capacitors C2 and C3. Accordingly, the voltage having the level of 2 Vdc/3 is transferred to the output terminal $ARM_A$.

Lastly, referring to FIG. 7B, when a switching device 326 is turned on by the voltage VB/2 at mode 3, the current $I_A$ is transferred directly to the node DC LEV3 of the voltage-dividing circuit 310 by passing through only the turned-on switching device 326 without passing through the bidirectional switching device 330. Since the current $I_A$ transferred to the node DC LEV3 flows along a current path passing through all the capacitors C1 to C3, a voltage having the level of Vdc is output through the output terminal $ARM_A$.

As described above, as the plurality of switching devices 322 to 328 and the bidirectional switching device 330 are selectively turned on or turned off, the even-level inverter 200 may form different current paths in the topology circuit 300 as shown in FIG. 3. Output voltages of an AC signal type having four levels (levels 0 to 3 in the case of FIGS. 5 to 7) are generated from different current paths through the output terminal $ARM_A$. Meanwhile, in the embodiments of the present invention, the bidirectional switching device 330 is configured of only the transistor without the diode, and the neutral point outputting an intermediate level voltage in the voltage-dividing circuit 310 is not connected to even the bidirectional switching device 330 as well as the plurality of switching devices 322 to 328, whereby conduction loss may be reduced and reactive power may be controlled.

As set forth above, according to embodiments of the present invention, a neutral point (center tap) of a voltage-dividing circuit dividing input DC power into a plurality of voltage levels is electrically separated from switching devices and a bidirectional switching device is configured of only a transistor without an anti-parallel diode. Accordingly, conduction loss can be reduced and reactive power can be efficiently controlled.

While the present invention has been shown and described in connection with the embodiments, it will be apparent to those skilled in the art that modifications and variations can be made without departing from the spirit and scope of the invention as defined by the appended claims.

What is claimed is:

1. An even-level inverter, comprising:
a voltage-dividing circuit dividing input DC power into an even number of voltage levels;
a plurality of switching devices each having a first node and a second node, wherein the first node of each switching device is connected to a different respective node of the voltage-dividing circuit having the even number of voltage levels; and
a bidirectional switching device connected between the second nodes of the plurality of switching devices so as to connect to the individual nodes of the voltage-dividing circuit through at least one of the plurality of switching devices and including at least two transistors,
wherein the voltage-dividing circuit includes at least two capacitors, and a node between the at least two capacitors is electrically separated from the plurality of switching devices and the bidirectional switching device, and
wherein the bidirectional switching device comprises:
a first node connected to the second nodes of two switching devices of the plurality of switching devices; and
a second node connected to an output node of the even-level inverter and to the second nodes of two other switching devices of the plurality of switching devices,
wherein the bidirectional switching device selectively connects the first and second nodes of the bidirectional switching devices.

2. The even-level inverter of claim 1, wherein the voltage-dividing circuit further includes a plurality of booster circuits respectively connected to the at least two capacitors, and the plurality of booster circuits share at least one node.

3. The even-level inverter of claim 2, wherein the node shared by the plurality of booster circuits is connected to the node between the at least two capacitors.

4. The even-level inverter of claim 1, wherein each of the plurality of switching devices includes at least one transistor and at least one diode, and
the plurality of switching devices each have a structure different from that of the bidirectional switching device.

5. The even-level inverter of claim 1, wherein the bidirectional switching device only includes an N channel transistor and a P channel transistor.

6. The even-level inverter of claim 1, wherein the plurality of switching devices and the bidirectional switching device provide different current paths in accordance with four voltage levels output from the voltage-dividing circuit.

7. The even-level inverter of claim 1, wherein the voltage-dividing circuit divides the input DC power into four voltage levels.

8. The even-level inverter of claim 1, wherein the node between the at least two capacitors is a node that is common to the at least two capacitors, that is not directly connected to the plurality of switching devices, and that is not directly connected to the bidirectional switching device.

9. The even-level inverter of claim 1, wherein the node between the at least two capacitors is electrically grounded.

10. The even-level inverter of claim 1, wherein the at least two transistors of the bidirectional switching device are connected to each other in parallel.

11. The even-level inverter of claim 1, wherein the bidirectional switching device does not include a diode coupled in parallel to the at least two transistors.

12. The even-level inverter of claim 1, wherein the bidirectional switching device is connected to each one of the individual nodes of the voltage-dividing circuit having the even number of voltage levels through a single respective switching device of the plurality of switching devices.

13. The even-level inverter of claim 1, wherein a node of the bidirectional switching device is an output node of the even-level inverter.

14. The even-level inverter of claim 13, wherein at least two switching devices of the plurality of switching devices each have a first node connected to a respective individual node of the voltage-dividing circuit having the even number of voltage levels and each have a second node connected to the output node of the even-level inverter.

15. The even-level inverter of claim 14, wherein at least two other switching devices of the plurality of switching devices each have a first node connected to a respective individual node of the voltage-dividing circuit having the even number of voltage levels and each have a second node connected to a node of the bidirectional switching device other than an output node of the even-level inverter.

16. An even-level inverter, comprising:
a voltage-dividing circuit generating input DC power having an even number of voltage levels at a plurality of nodes; and
a switching circuit receiving the input DC power and generating an AC output signal,
wherein:
the voltage-dividing circuit includes a plurality of capacitors connected in series,
a node between the plurality of capacitors connected in series is electrically separated from the switching circuit, and
the switching circuit comprises:
a first plurality of switching devices each operative to connect one of the plurality of nodes of the voltage-dividing circuit to an output of the even-level inverter; and
a second plurality of switching devices each operative to connect one of the plurality of nodes of the voltage-dividing circuit to a first node of a bidirectional switch, wherein a second node of the bidirectional switch is connected to the output of the even-level inverter.

17. The even-level inverter of claim 16, wherein the switching devices of the switching circuit each include a transistor and a diode, and the bidirectional switch includes a plurality of transistors only.

18. The even-level inverter of claim 17, wherein the first and second pluralities of switching devices provide different current paths in accordance with the voltage levels of the input DC power.

19. The even-level inverter of claim 16, wherein the voltage-dividing circuit divides the input DC power into four voltage levels.

* * * * *